United States Patent [19]

Lorenzo et al.

[11] 4,313,771

[45] Feb. 2, 1982

[54] LASER HARDENING OF STEEL WORK PIECES

[75] Inventors: Roberto Lorenzo, Penfield; Frank J. Wolf, Rochester, both of N.Y.

[73] Assignee: Xerox Corporation, Stamford, Conn.

[21] Appl. No.: 125,819

[22] Filed: Feb. 29, 1980

[51] Int. Cl.³ .............................................. C21D 1/06
[52] U.S. Cl. ........................................ 148/14; 148/27
[58] Field of Search ................... 148/4, 14, 13.1, 6.14, 148/6.24, 27

[56] References Cited

U.S. PATENT DOCUMENTS 3,447,974  6/1969  Saubestre et al. ................. 148/6.24

OTHER PUBLICATIONS

Surface Hardening and Alloying with a Laser Beam System, Industrial Heating, vol. XLI, No. 7, Jul. 1974, pp. 19–25.
Frederick A. Lowenheim, Electroplating, pp. 449–451, McGraw-Hill Book Company.

Primary Examiner—R. Dean

[57] ABSTRACT

A method of hardening the surface of steel work pieces is disclosed wherein the work piece is first treated with a solution to cause the blackening thereof and subsequently subjected to a laser beam for a time sufficient to raise the surface temperature thereof into the austenitic phase.

8 Claims, 2 Drawing Figures

LASER HARDENING OF STEEL WORK PIECES

BACKGROUND OF THE INVENTION

This invention relates to hardening of steel surfaces and more particularly to a method of hardening medium and high carbon content steel work pieces utilizing a laser source.

It has been heretofore known to utilize lasers in the heat treatment of metals wherein, the temperature of the piece being treated is not raised above the melting temperature of the material. Further, it is known to utilize laser energy to create a thin molten condition on the surface of a part thereby changing the crystalline structure of the metal to an amorphous structure. This process is called laser glazing. One problem encountered in the heat treating application is that high energy lasers must be employed.

It is accordingly, a primary object of this invention to provide a method of hardening medium and high carbon content steel utilizing a laser source of substantially less power than that heretofore known for this purpose.

PRIOR ART STATEMENT

Laser treatment of metals for various purposes has appeared in the literature. The following prior art appears to be relevant:

American Metal Market/Metal Working News, June 13, 1977, page 27, "United Technologies' 'Laser Glazing' Arousing Interest"—This article speaks generally of laser glazing by creating a thin molten layer on the surface of the cold piece to be so treated. Also mentioned is the transition hardening of metals without raising the temperature enough to produce melting.

U.S. Pat. No. 3,447,974—Saubestre and Hajdu—June 3, 1969

This patent relates to a composition and method of blackening ferrous metal articles utilizing an alkali metal hydroxide, an alkali metal nitrate and/or an alkali metal nitrite and as a smut inhibiting agent, a phenyl thiourea.

It is believed that the scope of the present invention, as defined by the appended claims, is patentably distinguishable over the foregoing prior art taken either singly or in combination with one another.

SUMMARY OF THE INVENTION

In accordance with the present invention, there is provided a method of heat treating the surface of carbon steel work pieces by applying a black coating on the surface of the steel work piece that absorbs at least about 65% of the light emitted by a $CO_2$ laser, and directing a $CO_2$ laser beam at the surface of the blackened work piece for a time sufficient to raise the temperature of the surface into the gamma ($\gamma$) or austenitic phase.

BRIEF DESCRIPTION OF THE DRAWINGS

Other objects and advantages of the present invention will become apparent from the following detailed description taken in conjunction with the accompanying drawings, in which.

Figure 1:
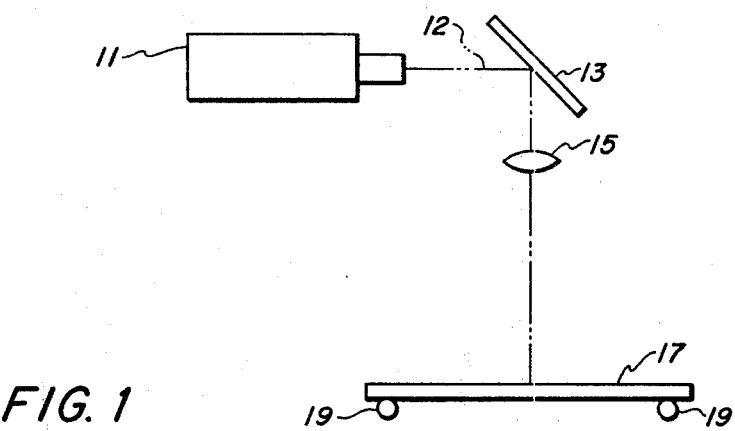
FIG. 1 is a Fe:$Fe_3$C phase diagram showing the percentage of carbon from 0 to 2.0 percent.

While the present invention will hereinafter be described in connection with various embodiments thereof, it will be understood that it is not intended to limit the invention of these embodiments. On the contrary, it is intended to cover all alternatives, modifications, and equivalents as may be included within the spirit and scope of the invention as defined by the appended claims.

DETAILED DESCRIPTION OF THE INVENTION

In accordance with this invention, a carbon dioxide laser beam is scanned over the surface of the steel work piece to be hardened. The work piece prior to laser scanning is subjected to blackening at least in the areas to be hardened. While the black coating must be present in the areas to be hardened, it is desirable and preferable to treat the entire steel work piece with the blackening solution, described herein below, for ease of operation. The steel work piece, in accordance with this invention, can have any form including tubular products, rods, shafts, bars, plates, wire, machined parts, castings, forgings and the like having complicated shapes such as gears, pulleys, wheels, rails, housings, axels and the like. For the purpose of simplicity, and ease of understanding, the invention will be described throughout the remainder of this specification with respect to rods, however, it is to be understood that this is for the purpose of explanation of the invention only and that any shape work piece having the characteristics defined and claimed herein can be the subject of the method of hardening in accordance with this invention.

The steel employed in the method of hardening as described herein is medium and high carbon steel having a carbon content of from about 0.4 percent to about 1.2 percent by weight carbon. This includes all such steels having this carbon content, typical examples of which are those steels bearing AISI number steels 1141, 11L41, 1060, 1080, 1090, tool steels and the like. It is essential for the operation of the method in accordance with this invention that the black coating be capable of absorbing at least 65% and preferably 90% of the light emitted by the $CO_2$ laser, which emits radiation having a wavelength of 10.6 microns.

The method of determining the absorption characteristics of the black coating is by measurement of the reflectivity of the steel work piece coated with the black coated and comparing the value with the reflectance of an uncoated work piece, as a standard. The instrument employed in measuring the reflectivity is an FTS (Fourier Transform System) Infrared Spectrometer, sold by Digilab Inc. of Cambridge, Mass.. Absorption of the black coated work piece is determined by the formula (1-reflectivity)$\times 100$ = % absorption. Thus, for example, if a coated work piece exhibits a reflectivity of 0.3 when compared with a similar uncoated work piece, it will have an absorption of 70%. The light employed in these measurements has a wavelength of 10.6 microns, the same as that of a $CO_2$ laser.

In conducting the method of this invention, the surface of the work piece is essentially blackened by any suitable material which will absorb the $CO_2$ laser energy in the percentage indicated above. Particularly suitable, and preferred black coatings are formed utilizing a solution of an alkali metal hydroxide, alkali metal nitrate and/or an alkali metal nitrite and optionally an alkali metal carbonate in water. The solid materials are mixed with water in an amount sufficient to produce a blackening solution having a boiling temperature between about 124° C. to about 165° C. A particularly suitable process of the blackening is brought about by immersing the steel work piece in a blackening bath including an aqueous solution of from about 0.02 to about 2 parts of phenylthiourea of the formula

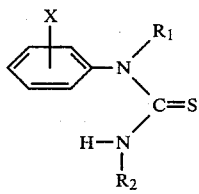

wherein $R_1$ and $R_2$ are hydrogen, phenyl or tolyl, X is hydrogen or methyl with the provision that when $R_1$ is hydrogen, $R_2$ is either hydrogen, phenyl or tolyl, and when $R_1$ is phenyl or tolyl, $R_2$ is hydrogen. The methyl of the tolyl group or groups is in the ortho or para position. Compounds included within this formula are monophenylthiourea, N,N-di-phenylthiourea, N,N'-diphenylthiourea, monotolylthiourea, N,N-ditolylthiourea and N,N'-ditolylthiourea. In addition to the about 0.02 to about 2 parts of phenylthiourea, the blackening composition contains from about 50 to about 90 parts of an alkali metal hydroxide, from about 10 to about 50 parts of an alkali metal nitrite and from about 10 to about 50 parts of an alkali metal nitrite. The alkali metal is sodium or potassium. The dry ingredients indicated above are either mixed initially and then added to water or are added separately to water in an amount such that it will bring the boiling point of the aqueous solution to within the temperature range of from about 124° C. to about 165° C. Suitable blackening baths in accordance with the above description are set forth in U.S. Pat. No. 3,447,974 issued to Saubestre and Hajdu on June 3, 1969, all of which are incorporated herein by reference.

It is to be understood that the phenylthiourea material added to the baths in accordance with the patent mentioned above is to control smut and thereby increase the lifetime of the blackening baths and that the baths without this additive or baths including other compounds such as, for example, alkylthioureas for instance diethylthiourea may be employed so long as they produce black coatings on the steel work pieces having an absorption of at least 65% with respect to a $CO_2$ laser.

The steel work piece is immersed in the boiling aqueous solution containing the alkali metal salt in the proportions indicated for a time sufficient to obtain a black coating on the work piece and then removed therefrom. The work piece containing a black coating is then rinsed in clear water and ready for treatment with the $CO_2$ laser for the hardening thereof.

Phosphate coatings are also suitable to obtain a sufficiently absorptive black surface on the work piece. Suitable commercially available phosphate coatings include iron, zinc and manganese. These coatings are employed currently as a base for painting, lubrication during drawing or shaping and corrosion protection. Detailed descriptions of these processes and materials are set forth in "Electroplating" by Frederick A. Lowenheim, McGraw-Hill Book Company and "Metal Finishing", Mid January 1980, Vol. 78, No. 1A. A suitable commercially available phosphate coating is available from Mitchell Bradford Chemical Company, Inc., 160 Wampus Lane, Milford, Conn. and sold under the trade designation Mi Phos M-5 Liquid Concentrate.

A third type of suitable black coating can be formed on the work piece utilizing a combination of alkali metal phosphates and fluorides. A suitable solution employs about 50 grams of $Na_3 PO_4$ 12 $H_2O$, about 20 grams of KF $2H_2O$, about 20 milliliters of 50% by volume hydrofluoric acid and about 1000 milliliters of water.

It is desirable prior to subjecting the work piece to the blackening solution to prepare the surface thereof by suitable techniques, know in the art, such as degreasing, pickling, rinsing and the like.

The blackening solution may be applied to the surface of the work piece by any suitable technique such as for immersion, spraying, doctor coating, wiping and the like. It is essential, however, that the material and method of application produce a coating that absorbs at least 65% of the light emitted by a $CO_2$ laser. For this purpose, immersion is the preferred technique.

Subsequent to the blackening of the steel work piece surface, the surface is subjected to a $CO_2$ laser in order to raise the temperature of the surface into the face centered cubic, gamma region commonly referred to as the austenitic region. Thus, the laser beam is either scanned across the surface of the work piece or the work piece moved beneath the surface of the laser beam, or a combination of these two motions to cause the impingement of the laser beam onto the entire area of the work piece to be hardened. The laser employed is a commercial unit sold under the name Everlase 525 by the Coherent Corporation, Palo Alto, California. The laser beam is focused utilizing a cylindrical lens having a focal length of 12.7 centimeters. The work piece is positioned at the focal point of the lens. This particular $CO_2$ laser has a power which is variable over a narrow range of from about 450 to about 600 watts and is moved with respect to the surface at a speed suitable to control the hardening of the surface to a depth of from about 0.15 millimeters to about 0.8 millimeters. The work piece is moved with respect to the laser beam at the rate of about 10 to about 25 linear centimeters per minute and preferably at the rate of about 15 to about 20 linear centimeters per minute. At this preferred rate, a penetration depth of the hardened surface is about 0.2 to 0.3 millimeters. It is interesting to note that the hardness of a steel shaft for example following the procedure of this invention is increased from about 30 to about 48 to 52 on the Rockwell C hardness scale. Also, it is interesting to note that but for the presence of the black coating on the work piece prior to the laser treatment, it would require a laser having a power of about 18 kilowatts in order to achieve the same hardness characteristic in the finished work piece.

The invention will be further described in connection with the accompanying drawings. FIG. 1 is a phase diagram of the carbon iron alloy system wherein the carbon is present from 0 to 2% by weight. The remaining portion where higher carbon contents are present has not been included herein because it is not relevant to the alloys included within the scope of this invention. In accordance with this phase diagram, it is necessary in order to achieve the hardening characteristics that the surface temperature of the work piece be raised into the face centered cubic indicated in the phase diagram by the area marked gamma ($\gamma$). Thus, at a 0.4% carbon content the temperature of the work piece surface must be raised approximately to 780° C. in order to achieve this austenite or gamma phase. At the eutectic indicated in the diagram as 0.8% carbon the temperature of 723° C. must be reached before this condition results. At the maximum carbon content included with the scope of this invention, that is 1.2% carbon, a temperature of approximately 910° C. must be achieved. Once this austenite or gamma phase condition is achieved, the surface is self-quenching because the remainder of the work piece remains cool and acts as a heat sink for the material raised into the gamma phase. Thus, depending upon the dwell time of the laser, the beam size of the laser and the power of the laser beam, the depth of the hardening process is controlled.

Figure 2:
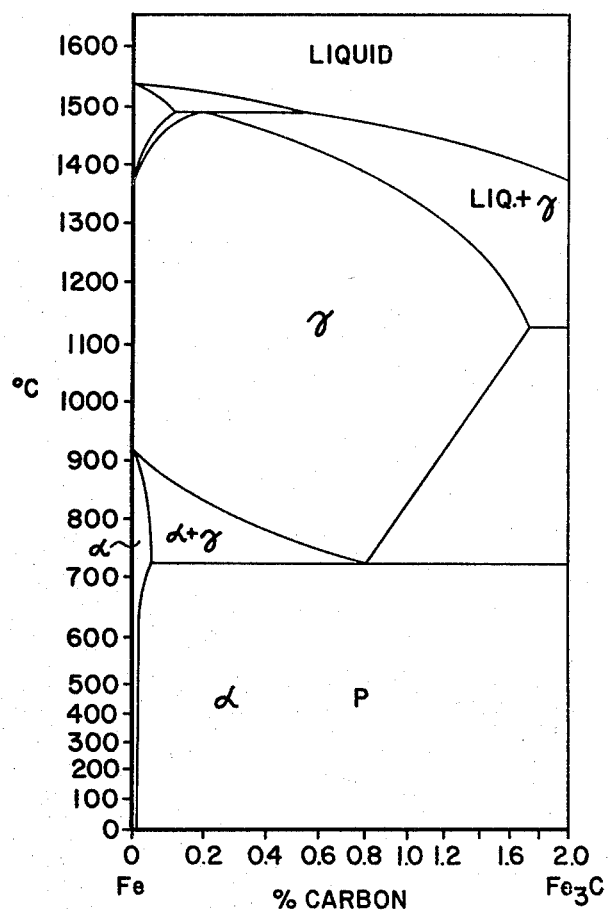
FIG. 2 is a schematic elevation view of an apparatus for carrying out the method of this invention.

FIG. 2 illustrates schematically a laser unit capable of performing the hardening operation in accordance with this invention. The laser unit itself indicated by reference numeral 11 emits a beam 12 which is reflected by a suitable mirror surface 13 through a cylindrical lens 15 which focuses the beam onto the surface of the work piece 17. A suitable means 19 shown in FIG. 2 as a pair of rollers is provided for moving the work piece beneath the surface of the laser beam 12. It is to be understood that suitable means can be provided for scanning the laser beam over the work piece or moving the work piece beneath the surface of the laser beam. In an embodiment wherein a rod is being hardened in accordance with this invention, a means is provided for rotating the rod and moving it axially beneath the surface of the laser in order to impart to the work piece a spiral or barber pole pattern of the laser on the surface. The rate at which the rod is rotated and the axially direction imparted to the rod beneath the laser surface can be controlled in order that the hardening is continuous across the entire surface of the rod without any intermittant areas of unhardened material being present. In a most preferred embodiment, wherein the $CO_2$ laser has a power of 525 watts, the rod is moved at a linear speed of about 17.8 linear centimeters per minute to achieve hardening to a depth of about 0.25 millimeters.

The invention will be further illustrated by the following examples in which parts and percentages are by weight unless otherwise indicated.

EXAMPLE I

A dry powder mixture is prepared from about 64.5 parts of NAOH, 22 parts of $NaNO_3$, 13 parts of $NaNO_2$, 0.3 parts of sodium aluminate, 0.2 parts of monophenyl-thiourea and about 0.01 part of a wetting agent of sodium xylene sulfonate. This dry powder is mixed with water to form a blackening bath in the proportions of 0.8 kilograms to about 0.9 kilograms of dry powder per liter of total solution. The bath is brought to boiling temperature of about 143° C. and maintained at this temperature by the addition of deionized water. A work piece of AISI 1141 steel in the form of a rod having a diameter of 0.95 centimeters and a length of 38 centimeters is immersed in this bath and a uniform black coating on the work piece results. The shaft is removed from the bath and rinsed with dionized water. The coated rod absorbs about 70% of the light emitted by a $CO_2$ laser. The rod is inserted into a fixture for laser address. The laser employed is an Everlase 525, $CO_2$ laser and is moved in a spiral pattern over the surface of the rod at a traverse speed of 17.8 centimeters per minute. The laser beam is passed through a cylindrical lens of 12.7 centimeters focal length and the work piece is positioned at this focal length from the lens. The end 3.8 centimeter sections of the rod is exposed in this fashion to the laser energy. The hardness of the rod initially is about 32 Rockwell C and afteer the laser treatment is 48-52 hardness on the Rockwell C scale. It is additionally observed that the laser treated rods demonstrated increased resistance to corrosion when repeatedly subjected to the oils from the human hand as compared with those rods which were merely blackened.

EXAMPLE II

The procedure of Example I is repeated except that the black coating is manganese phosphate applied by immersing the work piece in a 10% by volume solution in water of Mi Phos M-5 Liquid Concentrate sold by Mitchell Bradford Chemical Company Inc. at a temperature of 96°-100° C. for about 50 minutes. The coated work piece absorbs about 68 percent of $CO_2$ laser light impinged thereon. The hardness of the rod is greatly improved by the laser hardening.

While the invention has been shown and described with reference to the preferred embodiments thereof, it will be understood by those skilled in the art that various changes in form and detail may be made without departing from the spirit and the scope of the invention.

What is claimed is:

1. A method of heat treating the surface of carbon steel work pieces which comprises blackening the surface of the steel work piece by a blackening composition containing an alkali metal hydroxide, and an alkali metal nitrate or an alkali metal nitrite, so that at least 65% of the light emitted by a $CO_2$ laser is absorbed thereby, and directing a $CO_2$ laser beam having a power output ranging from about 450 watts to about 600 watts at the surface of the work piece for a time sufficient to raise the surface temperature into the gamma range.

2. The method of claim 1 wherein the blackening composition further containing a phenyl thiourea.

3. The method of claim 2 wherein the steel work piece has carbon content of from about 0.4 to about 1.2 percent by weight.

4. The method of claim 2 wherein the surface of the work piece is hardened to a depth of from about 0.15 millimeters to about 0.8 millimeters.

5. The method of claim 4 wherein the surface of the work piece is hardened to a depth of about 0.2 to about 0.3 millimeters.

6. The method of claim 2 wherein the $CO_2$ laser beam is caused to impinge upon the work piece normal to the surface thereof.

7. The method of claim 2 wherein the work piece and the laser beam is moved relatively with respect to each other at the rate of from about 10 to about 25 linear centimeters per minute.

8. The method of claim 7 wherein the work piece and the laser beam are moved relative with respect to each other at a rate of from about 15 to about 20 linear centimeters per minute.

* * * * *